July 1, 1924.  
R. A. BECKWITH  
TRANSMISSION  
Filed May 5, 1922  
1,499,634  
2 Sheets-Sheet 1

Witness:  
W. K. Olson

Inventor:  
Raymond A. Beckwith  
By Brown, Bontener & Drenner  
Attys

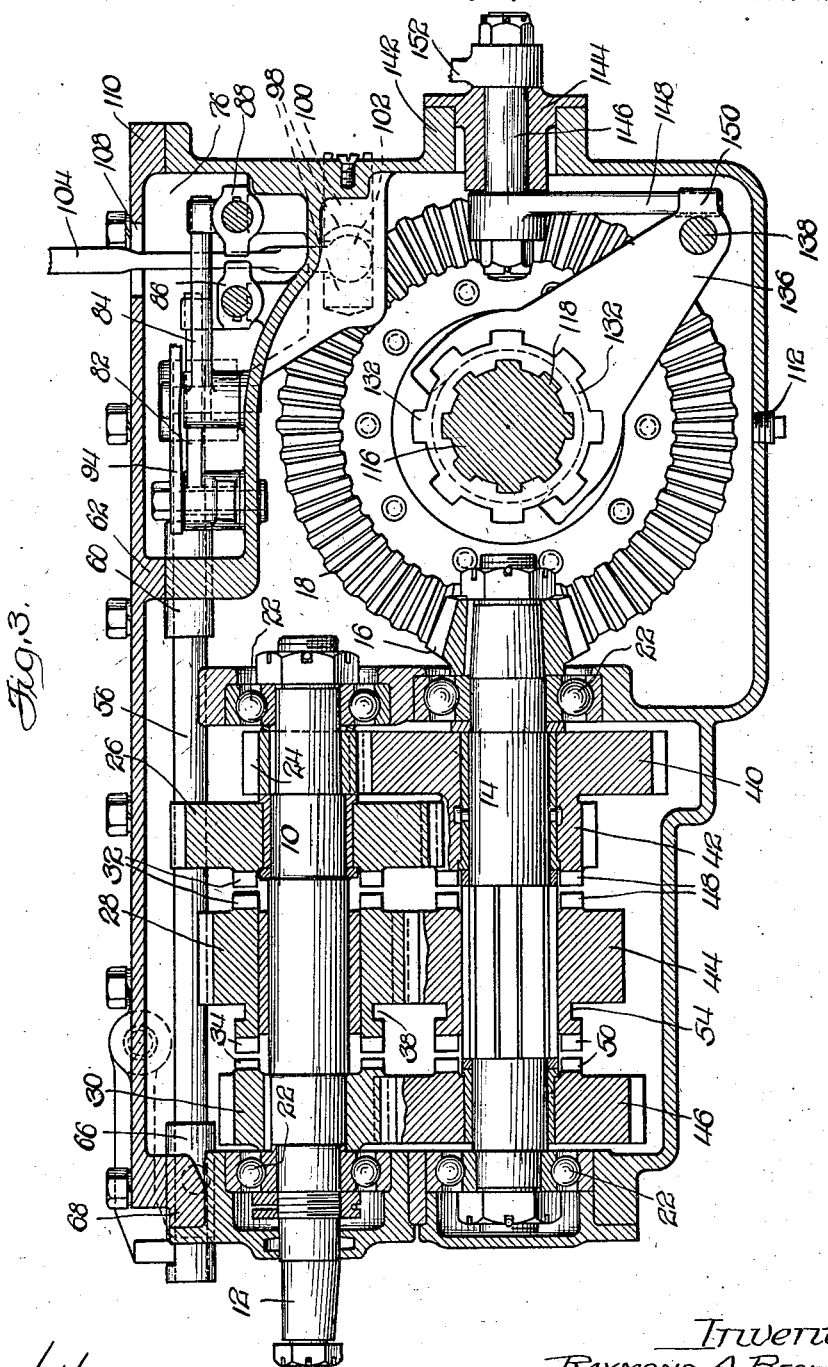

Patented July 1, 1924.

1,499,634

UNITED STATES PATENT OFFICE.

RAYMOND A. BECKWITH, OF MILWAUKEE, WISCONSIN, ASSIGNOR TO NATIONAL BRAKE & ELECTRIC COMPANY, OF MILWAUKEE, WISCONSIN, A CORPORATION OF WISCONSIN.

TRANSMISSION.

Application filed May 5, 1922. Serial No. 558,630.

*To all whom it may concern:*

Be it known that I, RAYMOND A. BECKWITH, a citizen of the United States, residing at Milwaukee, in the county of Milwaukee and State of Wisconsin, have invented a certain new and useful Improvement in Transmission, of which the following is a full, clear, concise, and exact description, reference being had to the accompanying drawings, forming a part of this specification.

My invention relates to power transmission and more specifically to variable speed transmission gearing.

One object of the invention is to provide a simple and improved unitary mechanism for changing speed and direction of drive in a locomotive.

Another object is to provide an improved and simple transmission from a rotating source of power to a driven element rotating on an axis parallel to that of said source.

Another object is to provide an improved transmission including the last mentioned transmission for a driven element rotating on an axis lying in a plane normal to the axis of the source of power.

Another object is to provide simple change speed means operable selectively without moving gear teeth into or out of mesh.

Another object is to provide a transmission affording four different speeds in either direction as well as a general average reduction of speed, comprising a minimum number of transmission elements.

Further objects and advantages of the invention will become apparent as the description proceeds.

Figure 1:
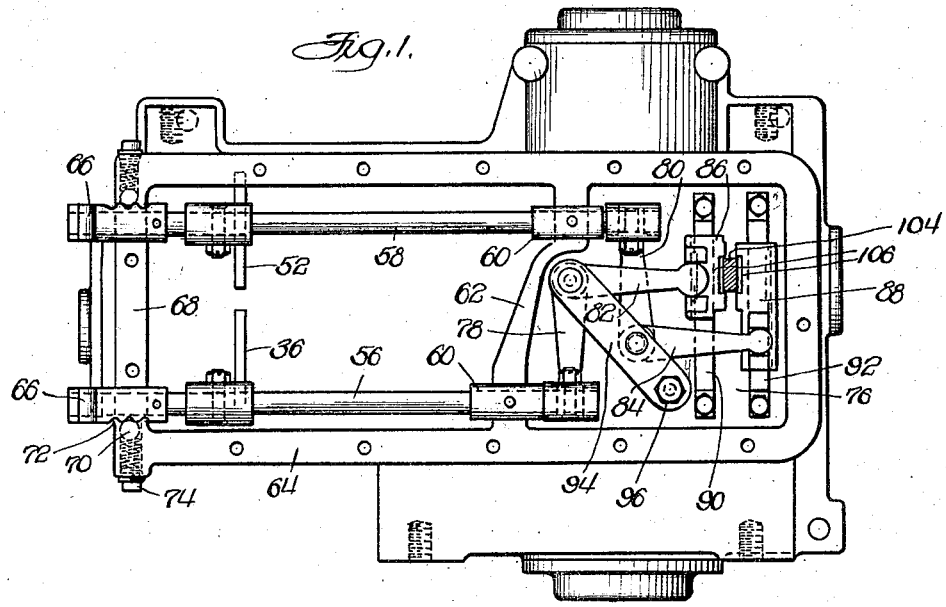

In the accompanying drawings, Figure 1 is a plan view of a transmission unit according to my invention, with the cover and the gears removed.

Figure 2:
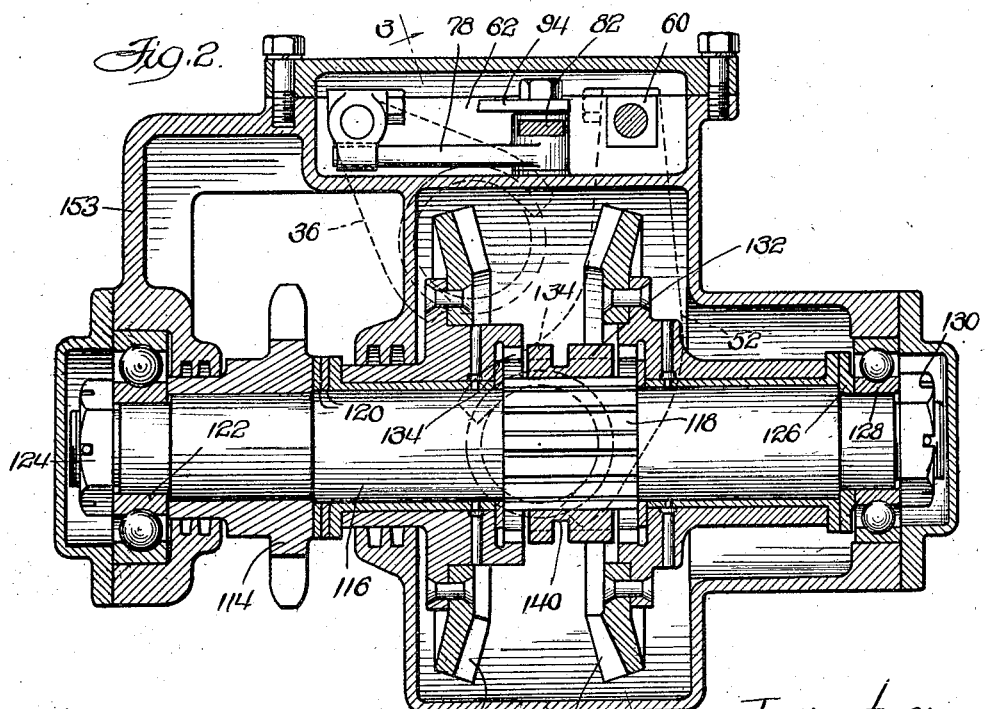

Figure 2 is a transverse section in the vertical plane of the transverse shaft, and Fig. 3 is a longitudinal section, the rear portion being taken on a vertical plane and the front portion being on an inclined plane through the drive shaft, as indicated by line 3—3 of Fig. 2.

In the embodiment of my invention selected for illustration, the upper longitudinal shaft 10, which for the purpose of the present disclosure may be considered the source of power, itself receives energy delivered to its projecting end 12 from any suitable power plant (not shown). The lower longitudinal shaft extends in parallelism with shaft 10 and carries a bevel pinion 16 continually meshing with each of the two bevel gears 18 and 20. Both shafts are carried in suitable ball bearings 22, those for the lower shaft being designed to take the thrust on the bevel pinion 16.

Each of the parts so far enumerated rotates in the same direction at all times, but the gearing connection between shafts 10 and 14 provides for four different speed ratios between them. For this purpose shaft 10 carries a pinion 24 keyed to the shaft, a gear 26 rotatable on the shaft, a gear 28 rotatable and slidable on the shaft, and a gear 30 keyed to the shaft. Cooperating teeth 32 connect gears 26 and 28, and similar teeth 34 connect gears 28 and 30, upon appropriate sliding movement of gear 28 by means of a shifting fork 36 (see Fig. 2) entering an annular groove 38 formed in said gear.

Shaft 14 carries a gear 40 loose on the shaft and in mesh with pinion 24, a pinion 42, integral with or permanently fastened to gear 40 and meshing with gear 26, a gear 44 splined on the shaft, and meshing with gear 28, and a gear 46 loose on the shaft and meshing with gear 30. Cooperating clutch teeth 48 connect pinion 42 and gear 44, and similar clutch teeth 50 connect gears 44 and 46, upon appropriate movement of gear 44 by means of a shifting fork 52 (see Fig. 2) engaging an annular groove 54 in said gear. The slidable gears 28 and 44 have teeth with longer faces than the remaining gears, so that with either gear shifted in either direction, the portions of the teeth engaging with each other, will provide ample surface for transmitting the force between them.

The operation of the parts so far described is as follows:

When teeth 32 are interlocked the drive is from shaft 10 to pinion 24, gear 40, pinion 42, gear 26, clutch teeth 32 and gears 28 and 44 to shaft 14. This provides the lowest speed ratio between shaft 14 and shaft 10. When teeth 48 are interlocked, the drive is from shaft 10 through pinion 24, gear 40, the shank of pinion 42, teeth 48 and gear 44 to shaft 14. This provides a second speed for shaft 14. It should be noted that this drive involves transmission of power through only one set of gear teeth, namely between pinion 24 and gear 40. When teeth 50 are interlocked, the drive is from shaft 10 through gear 30, gear 46, teeth 50 and gear 44 to shaft 14. This provides a third speed for shaft 14, which also involves transmission of power through only one set of gear teeth, namely between gears 30 and 46. When teeth 34 are interlocked, the transmission of power is through the body of gear 30, teeth 34 and gears 28 and 44 to shaft 14. This provides a fourth speed for shaft 14, which also involves the transmission of power through only one set of intermeshing teeth.

Obviously no two sets of clutch teeth could be interlocked at the same time without locking the entire transmission against rotation, with disastrous consequences. Manual control means are provided for selectively moving any one of the four sets of clutch teeth into interlocking relation. Shifting forks 36 and 52 are carried on longitudinally slidable rods 56 and 58 respectively. Each rod carries a front sleeve 60 slidable through a suitable guiding aperture in the transverse wall 62 of the casing 64, and a rear sleeve 66 similarly slidable through the rear wall 68. Each sleeve 66 is resiliently held in any one of three predetermined positions by a spring pressed ball 70 housed in the wall of the casing and engaging notches 72 in the side of the sleeve. A combined retainer and adjusting nut 74 is preferably provided for loading the ball 70. The rear ends of rods 56 and 58 project through wall 62 into a separate compartment 76 for ball and socket connection with the transversely extending arms 78 and 80 of two bell crank levers having longitudinally extending arms 82 and 84 similarly connected to sliding shoes 86 and 88 on transverse guide rods 90 and 92. A cover strip 94 connected at one end to a brace pin 96 receives the upper ends of the pintles for the bell crank levers to brace and stiffen them.

A blind bore in the bottom of compartment 76 houses socket members 98 held in place by plug 100. The socket members receive the rounded terminal 102 of the manual control lever 104 extending upward thru notches 106 in the inner side of shoes 86 and 88, and through an H-shaped slot 108 in the cover 110. The lever is constrained by the H-shaped slot to move laterally entirely into one notch 106 before it can slide parallel to guide rods 90 and 92 to rotate one of the bell crank levers and shift the corresponding gear.

Referring to the left hand end of Fig. 1 as the front of the machine, the positions corresponding to the different speeds are as follows: First speed, forward and to the right; second speed, rearward and to the left; third speed rearward and to the right; and fourth speed forward and to the left.

The mechanism so far described operates under selective control by the operator, to drive gears 18 and 20 in opposite directions at any one of four predetermined speeds compared with the speed of shaft 10. These gears preferably run in a bath of lubricant, which may be drained by means of plug 112. Power is delivered to an external drive by sprocket 114 on the transverse shaft 116 on which gears 20 and 18 are loosely mounted.

The central portion of shaft 116 is enlarged at 118 and cut into a plurality of spline grooves. Gear 20 is held against longitudinal movement by abutment against the end of this enlargement in one direction, and in the opposite direction by abutment with the face of the sprocket 114, antifriction washers 120 being provided between the two. Finally, sprocket 114 and the inner race 122 of the ball bearing at this end of the shaft are held in place by nut 124. On the other half of the shaft gear 18 is similarly held by abutment with the enlargement 118 and with a washer 126 held in place with the inner race 128 by nut 130. A clutch sleeve 132 is slidable between the opposing faces of gears 20 and 18 into interlocking engagement with the teeth 134 on either of them by means of a shifting fork 136 slidably mounted on shaft 138 and engaging groove 140. At the rear end of the casing a boss 142 receives a plug 144 forming a journal for a pin 146 which carries a crank arm 148, lying between lugs 150 projecting from shifting fork 136. An upwardly projecting manual control lever 152 is keyed to pin 146. It will be apparent that either gear 20 or 18 may be readily clutched to shaft 116 at the will of the operator to drive sprocket 114 in either direction.

The entire transmission provides a very compact arrangement capable of being enclosed in a housing of relatively simple shape. Bracket 153 is preferably integral with the main body of the casing to provide a rigid out board support for the projecting end of shaft 116.

Without further elaboration the foregoing will so fully explain the gist of my invention, that others may, by applying current knowledge, readily adapt the same for use under various conditions of service, without eliminating certain features which may properly be said to constitute the essential items of novelty involved, which items are intended to be defined and secured to me by the following claims.

I claim:

1. In combination, two shafts, four sets of two gears each, one gear of each set being on each shaft, and means for connecting said shafts through any one of three of said sets, or through the fourth set in series with two other sets.

2. In combination, two shafts, four sets of two gears each, one gear of each set being on each shaft, and means for connecting said shaft through any one of three said sets, or through the fourth set in series with certain other of said sets.

3. In combination, two shafts, four sets of two gears each, one gear of each set being on each shaft, and means for connecting said shaft through certain of said sets individually, or through one of said sets in series with certain other of said sets.

4. In combination, two shafts, four sets of two gears each, one gear of each set being on each shaft, and means for connecting said shaft through any one of three of said sets, or through the fourth set interpolated in series between two other sets.

5. In combination, two shafts, four sets of two gears each, one gear of each set being on each shaft, one gear on each shaft being axially slidable, two non-slidable gears on one shaft being keyed thereto, and the slidable gear on the other shaft being splined thereto.

6. In combination, two shafts, four sets of two gears each, one gear of each set being on each shaft, one set of gears being both axially slidable on their respective shafts, and cooperating clutch teeth on both ends of each slidable gear and on the adjacent faces of the adjacent gears on the same shaft.

7. In combination, two shafts, four sets of two gears each, one gear of each set being on each shaft, one set of gears being both axially slidable on their respective shafts, and cooperating clutch teeth on both ends of each slidable gear and on the adjacent faces of the adjacent gears on the same shaft, said slidable gears having a long enough tooth face to carry the driving forces with either gear displaced axially in either direction.

8. In combination, a drive shaft and a driven shaft, end gears splined on the drive shaft, end gears loose on the driven shaft and meshing continually with the splined end gears, an intermediate back gear on the driven shaft rotating with one end gear, an intermediate back gear loose on the drive shaft meshing continually with the other back gear, a pair of intermediate gears on said shafts, the gear on said driven shaft being keyed thereto, and means for clutching either of said last mentioned gears to either adjacent gear on the same shaft.

9. In combination, a drive shaft and a driven shaft, end gears splined on the drive shaft, end gears loose on the driven shaft and meshing continually with the splined end gears, an intermediate back gear on the driven shaft rotating with one end gear, an intermediate back gear loose on the drive shaft meshing continually with the other back gear, a pair of intermediate gears on said shafts, the intermediate gear on said driving shaft being loose and axially slidable, and the intermediate gear on said driven shaft being splined thereto, clutch teeth on both ends of both slidable gears and on the adjacent gears on each shaft, and means for sliding either gear in either direction.

10. In combination, a drive shaft and a driven shaft, a gear loose and axially slidable on said drive shaft, a gear meshing therewith and splined on said driven shaft, gears at both ends of both slidable gears continually driven by said source of power at various speeds, and means for clutching either of said first two gears to the gear at either end of it.

11. In combination, a drive shaft and a driven shaft, a gear loose and axially slidable on said drive shaft, a gear meshing therewith and splined on said drive shaft, gears at both ends of both slidable gears continuously driven by said source of power at various speeds, clutch teeth on both ends of both slidable gears, cooperating clutch teeth on the adjacent ends of the other gears and means for sliding either slidable gear in either direction into clutching engagement with one of the other gears.

12. In combination, a drive shaft and a driven shaft, a first pair of continuously meshing gears on said shafts, the gear on said driven shaft being non-rotatable with respect thereto, a second pair of continuously meshing gears on said shafts, the second gear on said drive shaft being non-rotatable with respect thereto, and means for selectively connecting either of said first pair of gears with the other gear on the same shaft.

13. In combination, a drive shaft, and a driven shaft, a first pair of continuously meshing gears on said shafts, the gear on said driven shaft being non-rotatable with respect thereto, a second pair of continuously meshing gears on said shafts, the second gear on said drive shaft being non-rotatable with respect thereto, one pair of gears being each independently slidable parallel to its axis, cooperating clutch teeth carried by adjacent faces of gears on the same shaft, and selective means for sliding either slidable gear into clutching engagement with the other gear on the same shaft.

14. In combination, a drive shaft and a driven shaft, a pair of continuously meshing gears on said shafts, the gear on said driven shaft being non-rotatable with respect thereto, a second pair of continuously meshing gears on said shafts, the second gear on said drive shaft being non-rotatable with respect thereto, a third set of continuously meshing gears on said shafts, connections for driving each gear of said third set from said drive shaft at a speed different from the second gear on the same shaft, and means for connecting either of said first gears to any other gear on the same shaft.

15. In combination, a drive shaft and a driven shaft, a first pair of continuously meshing gears on said shafts, the gear on said driven shaft being non-rotatable with respect thereto, a second pair of continuously meshing gears on said shafts, the second gear on said drive shaft being non-rotatable with respect thereto, a third and a fourth set of continuously meshing gears on said shafts, the third set being adjacent to said first set, the fourth gear on said drive shaft being keyed thereto, the third and fourth gears on said driven shaft being loose thereon and connected together, and means for connecting either of the first set of gears to either the second or third gear on the same shaft.

16. In combination, a drive shaft and a driven shaft, a pair of continuously meshing gears on said shafts, the gear on said driven shaft being non-rotatable with respect thereto, a second pair of continuously meshing gears on said shafts, the second gear on said drive shaft being non-rotatable with respect thereto, a third and a fourth set of continuously meshing gears on said shafts, the fourth gear on said drive shaft being keyed thereto, the third and fourth gears on said driven shaft being loose thereon and connected together, and means for connecting either of the first set of gears to either the second or third gear on the same shaft.

17. In combination, a drive shaft and a driven shaft, a first pair of continuously meshing gears on said shafts, the gear on said driven shaft being non-rotatable with respect thereto, a second pair of continuously meshing gears on said shafts, the second gear on said drive shaft being non-rotatable with respect thereto, a third and a fourth set of continuously meshing gears on said shafts, the third set being adjacent to said first set, the fourth gear on said drive shaft being keyed thereto, clutch teeth on both ends of said first set of gears, cooperating clutch teeth on the adjacent faces of the second and third gears on each shaft, and means for sliding either of said first gears in either direction.

18. In combination, a drive shaft and a driven shaft, a first pair of continuously meshing gears on said shafts, the gear on said driven shaft being non-rotatable with respect thereto, a second pair of continuously meshing gears on said shafts, the second gear on said drive shaft being non-rotatable with respect thereto, a third and fourth set of continuously meshing gears on said shafts, the third set being adjacent to said first set, the fourth gear on said drive shaft being keyed thereto, clutch teeth on the adjacent faces of the second and third gears on each shaft, and means for sliding either of said first gears in either direction, said first gears having axial dimensions permitting such sliding without reducing the length of intermeshing engagement between them below that necessary for satisfactory power transmission.

19. In a variable speed power transmission, a drive shaft, a driven shaft, a pair of continuously meshing gears, one on each shaft, and means for driving either gear at either one of two different speeds, said means comprising clutch elements at both ends of each gear, mechanism for driving all of said clutch elements at different speeds, and means for clutching either gear to either clutch element on the same shaft.

20. In a variable speed power transmission, a drive shaft, a driven shaft, a pair of continuously meshing gears, one on each shaft, and means for driving either gear at either one of two different speeds, said means comprising clutch elements at both ends of each gear, mechanism for driving all of said clutch elements at different speeds and means for sliding either gear into engagement with either clutch element on the same shaft.

21. In a variable speed power transmission, a drive shaft, a driven shaft, a pair of continuously meshing gears, one on each shaft, and means for driving either gear at either one of two different speeds, said means comprising clutch elements at both ends of each gear, mechanism for driving all of said clutch elements at different speeds, and means for sliding either gear into engagement with either clutch element on the same shaft, said gears having axial dimensions permitting such sliding without reducing the length of intermeshing engagement between them below that necessary for satisfactory power transmission.

22. In a motor vehicle, change speed mechanism including longitudinal parallel drive and driven shafts, a transverse shaft driven from said driven shaft, and a sprocket at one end of said transverse shaft, said driven parallel shaft being off-set laterally from said drive shaft to locate said change speed mechanism as a whole, centrally with reference to said transverse shaft.

23. In a motor vehicle, in combination, a transverse shaft, gears for driving said shaft, a casing for said gears, a sprocket on said shaft outside said casing for delivering power and a bracket integral with said casing and projecting around said sprocket to form an outboard support for said shaft.

24. In combination a driving shaft, a parallel driven shaft, four gears on each shaft constantly meshing with each other, the two end gears on one shaft being keyed thereto and one of the intermediate gears on the other shaft being splined to said latter shaft and having clutch elements on each end.

25. In a motor vehicle, in combination, a transverse shaft, bevel gears for driving said shaft, a longitudinal driving shaft, a lay shaft parallel to said longitudinal shaft having a bevel pinion co-operating with said bevel gears, change speed gears between the driving shaft and the lay shaft, manually operated means for selecting said change speed gears, said manually operated means extending above said gears, a gear box having bearings for the longitudinal shaft and having at one side a bearing for the transverse shaft, a power delivering pinion on said transverse shaft on the opposite side of the gear box and external of the same, a bracket integral with the gear box having a bearing for the outer end of said transverse shaft, and a compartment formed in the gear box at the junction of said bracket and said gear box for housing said gear selecting means.

In witness whereof, I hereunto subscribe my name this 2nd day of May, 1922.

RAYMOND A. BECKWITH.